(12) United States Patent
Stentz et al.

(10) Patent No.: US 11,231,286 B2
(45) Date of Patent: Jan. 25, 2022

(54) DYNAMIC ROUTING FOR SELF-DRIVING VEHICLES

(71) Applicant: UATC, LLC, San Francisco, CA (US)

(72) Inventors: Anthony Stentz, Pittsburgh, PA (US); Bryan Nagy, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 212 days.

(21) Appl. No.: 16/274,040

(22) Filed: Feb. 12, 2019

(65) Prior Publication Data
US 2019/0257661 A1    Aug. 22, 2019

Related U.S. Application Data

(63) Continuation of application No. 15/412,303, filed on Jan. 23, 2017, now Pat. No. 10,254,121.

(51) Int. Cl.
| | |
|---|---|
| *G01C 22/00* | (2006.01) |
| *G05D 1/00* | (2006.01) |
| *G01C 21/34* | (2006.01) |
| *G05D 1/02* | (2020.01) |

(52) U.S. Cl.
CPC ..... *G01C 21/3415* (2013.01); *G01C 21/3492* (2013.01); *G05D 1/0214* (2013.01); *G05D 1/0217* (2013.01); *G05D 1/0274* (2013.01); *G05D 1/0297* (2013.01); *G05D 2201/0213* (2013.01)

(58) Field of Classification Search
CPC ............. G01C 21/3415; G01C 21/36; G01C 21/3492; G05D 1/0214; G05D 1/0217; G05D 1/0274; G05D 1/0297; G05D 1/02; G05D 1/00; G05D 2201/0213

USPC .......................................................... 701/26
See application file for complete search history.

(56) References Cited

U.S. PATENT DOCUMENTS

| | | |
|---|---|---|
| 7,102,496 B1 | 9/2006 | Ernst, Jr. |
| 7,124,027 B1 | 10/2006 | Ernst, Jr. |
| 8,521,352 B1 | 8/2013 | Ferguson |
| 8,676,430 B1 | 3/2014 | Ferguson |
| 8,825,265 B1 | 9/2014 | Ferguson et al. |
| 9,140,792 B2 | 9/2015 | Zeng |
| 9,260,244 B1 | 2/2016 | Cohn |
| 9,459,625 B1 | 10/2016 | Ferguson |
| 9,494,439 B1 | 11/2016 | Ross |
| 9,547,307 B1 | 1/2017 | Cullinane |

(Continued)

FOREIGN PATENT DOCUMENTS

| | | |
|---|---|---|
| EP | 3032458 | 6/2016 |
| RU | 132393 | 9/2013 |

(Continued)

OTHER PUBLICATIONS

EESR in EP 17844132.5 dated Mar. 13, 2020.

(Continued)

*Primary Examiner* — Mahmoud S Ismail
(74) *Attorney, Agent, or Firm* — Mahamedi IP Law LLP

(57) ABSTRACT

A system can analyze a sensor view of a surrounding area of a self-driving vehicle (SDV). Based on analyzing the sensor view, the system can determine that a decision point along a current route of the SDV exceeds a predetermined risk threshold, and diverge the SDV from the current route based at least in part on the decision point exceeding the predetermined risk threshold.

20 Claims, 8 Drawing Sheets

(56) References Cited

U.S. PATENT DOCUMENTS

| | | | |
|---|---|---|---|
| 9,587,952 B1 * | 3/2017 | Slusar | G01C 21/3492 |
| 9,631,933 B1 | 4/2017 | Aula | |
| 9,739,881 B1 | 8/2017 | Pavek | |
| 9,754,490 B2 | 9/2017 | Kentley | |
| 9,841,763 B1 | 12/2017 | Valois | |
| 9,902,403 B2 | 2/2018 | Donnelly | |
| 9,904,375 B1 | 2/2018 | Donnelly | |
| 10,334,050 B2 | 6/2019 | Kentley-Klay | |
| 2004/0246147 A1 | 12/2004 | von Grabe | |
| 2008/0033645 A1 | 2/2008 | Levinson | |
| 2010/0262359 A1 | 10/2010 | Motoyama | |
| 2012/0173530 A1 | 7/2012 | Kurciska | |
| 2012/0296539 A1 | 11/2012 | Cooprider | |
| 2012/0310516 A1 | 12/2012 | Zheng | |
| 2013/0060461 A1 | 3/2013 | Wong | |
| 2013/0117321 A1 | 5/2013 | Fischer | |
| 2013/0282264 A1 | 10/2013 | Bastiaensen | |
| 2014/0046585 A1 | 2/2014 | Morris, IV | |
| 2014/0278052 A1 | 9/2014 | Slavin | |
| 2014/0358353 A1 | 12/2014 | Ibanez-Guzman | |
| 2015/0134178 A1 | 5/2015 | Minoiu-Enache | |
| 2015/0194055 A1 | 7/2015 | Maass | |
| 2015/0339928 A1 | 11/2015 | Ramanujam | |
| 2015/0369617 A1 | 12/2015 | Ding | |
| 2016/0035223 A1 | 2/2016 | Gutmann | |
| 2016/0054135 A1 | 2/2016 | Fowe | |
| 2016/0125608 A1 | 5/2016 | Sorstedt | |
| 2016/0167582 A1 | 6/2016 | Chen | |
| 2016/0247106 A1 * | 8/2016 | Dalloro | G06Q 10/06313 |
| 2016/0349063 A1 | 12/2016 | Maurer | |
| 2016/0364678 A1 | 12/2016 | Cao | |
| 2016/0378115 A1 * | 12/2016 | Yoo | G01S 17/89 701/36 |
| 2017/0008521 A1 | 1/2017 | Braunstein | |
| 2017/0023659 A1 | 1/2017 | Bruemmer | |
| 2017/0101097 A1 | 4/2017 | Buchner | |
| 2017/0123421 A1 | 5/2017 | Kentley | |
| 2017/0169366 A1 | 6/2017 | Klein | |
| 2017/0193826 A1 | 7/2017 | Marueli | |
| 2017/0227647 A1 | 8/2017 | Baik | |
| 2017/0287331 A1 | 10/2017 | Laur | |
| 2017/0309172 A1 | 10/2017 | Linder | |
| 2017/0315229 A1 | 11/2017 | Pavek | |
| 2017/0316696 A1 | 11/2017 | Bartel | |
| 2018/0060778 A1 | 3/2018 | Guo | |
| 2018/0061242 A1 | 3/2018 | Bavar | |
| 2018/0089518 A1 | 3/2018 | Yamashita | |
| 2018/0143639 A1 | 5/2018 | Singhal | |
| 2018/0342156 A1 | 11/2018 | Martin | |
| 2018/0345963 A1 | 12/2018 | Maura | |
| 2019/0258661 A1 | 8/2019 | Stentz | |
| 2019/0295421 A1 | 9/2019 | Bavar | |
| 2020/0073388 A1 | 3/2020 | Shashua | |

FOREIGN PATENT DOCUMENTS

| | | |
|---|---|---|
| WO | WO 2011055978 | 5/2011 |
| WO | WO 2014/139821 | 9/2014 |
| WO | WO 2014/147361 | 9/2014 |

OTHER PUBLICATIONS

ITP in EP 17844132.5 dated Mar. 20, 2020.
ISR in PCT/US2017/040532 dted Jan. 11, 2018.
ISR and Written Opinion in PCT/US2017/046796 dated Feb. 28, 2018.
ISR and Written Opinion in PCT/US2017/056277 dated Apr. 5, 2018.
Written Opinion in PCT/US2018/061024 dated Nov. 7, 2019.

* cited by examiner

DYNAMIC ROUTING FOR SELF-DRIVING VEHICLES

CROSS-REFERENCE TO RELATED APPLICATION

This application is a continuation of U.S. patent application Ser. No. 15/412,303, filed on Jan. 23, 2017; which is hereby incorporated by reference in its entirety.

BACKGROUND

Route optimization has evolved significantly to incorporate routing updates based on live traffic data received from global position system (GPS) resources of user devices, such as user smartphones, tablet computing devices, and on-board GPS navigation systems of vehicles traveling throughout a given region. These application-based, community-driven navigation solutions can offer real-time traffic updates and routing services based on current traffic conditions, and even allow users to submit reports (e.g., accident reports), which may then be provided to the network of users driving within a given locale.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
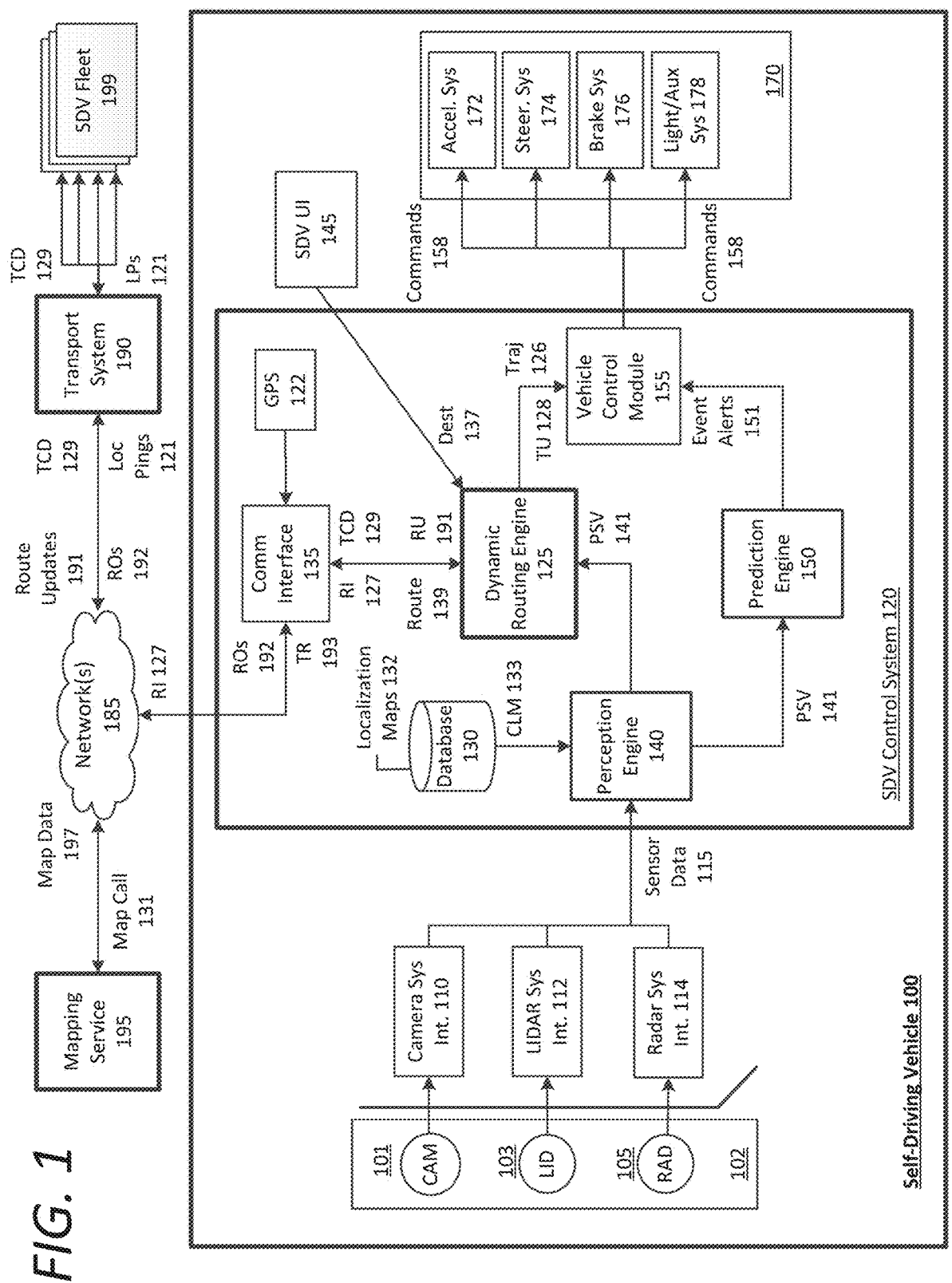
FIG. 1 is a block diagram illustrating an example self-driving vehicle operated by a control system implementing a dynamic routing engine, as described herein.

A self-driving vehicle (SDV) can include a sensor suite to generate a sensor view of a surrounding area of the SDV and acceleration, braking, and steering systems autonomously operated by a control system. In various implementations, the control system can dynamically analyze the sensor view of the surrounding area and a road network map (e.g., a highly detailed localization map) in order to autonomously operate the acceleration, braking, and steering systems along a current route to a destination. As described throughout the present disclosure, upon approaching a decision point along the current route, the control system can perform a cost analysis to determine whether to diverge from the current route. Execution of the cost analysis can correspond to optimizations between risk in continuing along the current route, risk in selecting alternative routes, and time deltas between the current route versus the alternative routes.

In certain examples, the SDV can include a communication interface to enable the control system to communicate to a backend transport routing system. In one aspect, the backend transport routing system can be implemented through one or more datacenters and can manage on-demand transportation services for a fleet of SDVs operating throughout a given region (e.g., a metroplex such as the Pittsburgh, Pa. metropolitan area and its suburbs). As the SDV operates throughout the given region, the SDV can transmit and receive communications to and from the backend transport routing system. These communications can comprise transport instructions to rendezvous with a requesting user at a pick-up location, location data indicating such pick-up locations and destinations, routing data indicating an optimal route to the pick-up location and then onwards to the destination, and routing updates indicating dynamic changes to traffic conditions along a particular route.

In various implementations, the SDV can also communicate route inquiries to the backend transport routing system. The transmission of route inquiries can be triggered by the SDV approaching a "decision point" on a road network map. As provided herein, a "decision point" can correspond to a perceived location or area along a current route in which multiple route options exist. For example, such decision points can correspond to intersections, highway exits and entrances, roundabouts, congested areas or road segments, individual congested lanes (e.g., a turn lane), road construction areas, closed roads, and the like. In some aspects, the decision points may be dynamically identified by the SDV through analysis of a live sensor view of the immediate surroundings of the SDV. Additionally or alternatively, the SDV can access a current localization map stored on-board, and identify the decision points on the map (e.g., a plurality of alternative routes).

Accordingly, upon approaching a decision point, the SDV can transmit a route option inquiry to a backend transport routing system, and receive one or more alternative route options that diverge from the current route at the decision point. In variations, the transmission of a route inquiry to the backend system can be triggered by a safety threshold calculated by the SDV being crossed. For example, if a right lane is too crowded and the SDV is unable to safely merge, the SDV can transmit the route option inquiry to the backend in order to receive a number of alternative route options. According to certain examples, the SDV can further determine, from the live sensor view, an immediate traffic situation on the current route, and compare the immediate traffic situation on the current route with one or more traffic situations corresponding to the one or more alternative route options. In variations, the backend can calculate an overall cost for each of the alternative route options (e.g., based on added time, risk and/or monetary cost), and can provide the alternative route options to the SDV in a ranked list that indicates the overall costs for each route option.

Execution of the cost optimization by the SDV can correspond to low level routing by the control system based on the dynamic analysis of the sensor view in light of the alternative route options. Each of the one or more alternative route options received from the backend can be associated with a time factor and/or a risk factor, which the control system of the SDV can utilize to determine whether to diverge from the current route. As such, the SDV can weigh the cost (e.g., time and/or risk) of the current situation with the costs of the alternative route options to make the route decision. The final decision by the control system can correspond to the SDV selecting an alternative route, or attempting to maintain the current route. Accordingly, this final decision can be based on the SDV's control system optimizing between the cost for continuing along the current route, and the costs for selecting each of the one or more alternative routes.

In some aspects, each parameter that goes into the overall cost for the current route and each alternative route can also be weighted. For example, risk may be weighted with respect to time on a sliding scale, or monetary cost may be weighted against risk on a sliding scale. Furthermore, the weightings may be time dependent such that the longer the control system takes to decide, the greater the likelihood that the control system will select a current path that does not require the SDV to execute maneuver, such as a lane change or turn. As provided herein the "current path" of the SDV is distinguished from the "current route" in that the current path may progress in concert with the current lane on which the SDV travels, whereas the current route may diverge from the current path accordingly. According to examples, in converging towards a final route decision, the cost analysis performed by the control system of the SDV can account for the weightings for each respective decision the SDV makes between a starting location and a destination. Thus, the SDV control system can perform such cost analyses dynamically (e.g., for every intersection) as it autonomously operates the acceleration, braking, and steering systems to progress the SDV to the destination.

Among other benefits, the examples described herein achieve a technical effect of providing route alternatives for decision points along a current route that the SDV can analyze for added flexibility, safety, and more seamless transportation flow for a given region. Accordingly, when an SDV experiences difficulty in following a current route (e.g., due to traffic blockage or unacceptable risk), the SDV can be provided with a set of one or more alternative routes, and make a selection based on the live situational environment.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the terms "autonomous vehicle" (AV) or "self-driving vehicle" (SDV) may be used interchangeably to describe any vehicle operating in a state of autonomous control with respect to acceleration, steering, and braking. Different levels of autonomy may exist with respect to AVs and SDVs. For example, some vehicles may enable autonomous control in limited scenarios, such as on highways. More advanced AVs and SDVs can operate in a variety of traffic environments without any human assistance. Accordingly, an "AV control system" can process sensor data from the AV or SDV's sensor array, and modulate acceleration, steering, and braking inputs to safely drive the AV or SDV along a given route.

System Description

FIG. 1 is a block diagram illustrating an example self-driving vehicle (SDV) operated by a control system implementing a dynamic routing engine, as described herein. In an example of FIG. 1, a control system 120 can autonomously operate the SDV 100 in a given geographic region for a variety of purposes, including transport services (e.g., transport of humans, delivery services, etc.). In examples described, the SDV 100 can operate without human control. For example, the SDV 100 can autonomously steer, accelerate, shift, brake, and operate lighting components. Some variations also recognize that the SDV 100 can switch between an autonomous mode, in which the SDV control system 120 autonomously operates the SDV 100, and a manual mode in which a driver takes over manual control of the acceleration system 172, steering system 174, braking system 176, and lighting and auxiliary systems 178 (e.g., directional signals and headlights).

According to some examples, the control system 120 can utilize specific sensor resources in order to autonomously operate the SDV 100 in a variety of driving environments and conditions. For example, the control system 120 can operate the SDV 100 by autonomously operating the steering, acceleration, and braking systems 172, 174, 176 of the SDV 100 to a specified destination. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes computational resources (e.g., processing cores and/or field programmable gate arrays (FPGAs)) which operate to process sensor data 115 received from a sensor system 102 of the SDV 100 that provides a sensor view of a road segment upon which the SDV 100 operates. The sensor data 115 can be used to determine actions which are to be performed by the SDV 100 in order for the SDV 100 to continue on a route to a destination. In some variations, the control system 120 can include other functionality, such as wireless communication capabilities using a communication interface 135, to send and/or receive wireless communications over one or more networks 185 with one or more remote sources. In controlling the SDV 100, the control system 120 can generate commands 158 to control the various control mechanisms 170 of the SDV 100, including the vehicle's acceleration system 172, steering system 157, braking system 176, and auxiliary systems 178 (e.g., lights and directional signals).

The SDV 100 can be equipped with multiple types of sensors 102 which can combine to provide a computerized perception of the space and the physical environment surrounding the SDV 100. Likewise, the control system 120 can operate within the SDV 100 to receive sensor data 115 from the collection of sensors 102 and to control the various control mechanisms 170 in order to autonomously operate the SDV 100. For example, the control system 120 can analyze the sensor data 115 to generate low level commands 158 executable by the acceleration system 172, steering system 157, and braking system 176 of the SDV 100. Execution of the commands 158 by the control mechanisms 170 can result in throttle inputs, braking inputs, and steering inputs that collectively cause the SDV 100 to operate along sequential road segments to a particular destination.

In more detail, the sensors 102 operate to collectively obtain a sensor view for the SDV 100 (e.g., in a forward operational direction, or providing a 360 degree sensor view), and further to obtain situational information proximate to the SDV 100, including any potential hazards or obstacles. By way of example, the sensors 102 can include multiple sets of camera systems 101 (video cameras, stereoscopic cameras or depth perception cameras, long range monocular cameras), LIDAR systems 103, one or more radar systems 105, and various other sensor resources such as sonar, proximity sensors, infrared sensors, touch sensors, and the like. According to examples provided herein, the sensors 102 can be arranged or grouped in a sensor system or array (e.g., in a sensor pod mounted to the roof of the SDV 100) comprising any number of LIDAR, radar, monocular camera, stereoscopic camera, sonar, infrared, or other active or passive sensor systems.

Each of the sensors 102 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 102 can include a video camera and/or stereoscopic camera system 101 which continually generates image data of the physical environment of the SDV 100. The camera system 101 can provide the image data for the control system 120 via a camera system interface 110. Likewise, the LIDAR system 103 can provide LIDAR data to the control system 120 via a LIDAR system interface 112. Furthermore, as provided herein, radar data from the radar system 105 of the SDV 100 can be provided to the control system 120 via a radar system interface 114. In some examples, the sensor interfaces 110, 112, 114 can include dedicated processing resources, such as provided with field programmable gate arrays (FPGAs) which can, for example, receive and/or preprocess raw image data from the camera sensor.

In general, the sensor systems 102 collectively provide sensor data 115 to a perception engine 140 of the control system 120. The perception engine 140 can access a database 130 comprising stored localization maps 132 of the given region in which the SDV 100 operates. The localization maps 132 can comprise highly detailed ground truth data of each road segment of the given region. For example, the localization maps 132 can comprise prerecorded data (e.g., sensor data including image data, LIDAR data, and the like) by specialized mapping vehicles or other SDVs with recording sensors and equipment, and can be processed to pinpoint various objects of interest (e.g., traffic signals, road signs, and other static objects). As the SDV 100 travels along a given route, the perception engine 140 can access a current localization map 133 of a current road segment to compare the details of the current localization map 133 with the sensor data 115 in order to detect and identify any objects of interest, such as moving vehicles, pedestrians, bicyclists, and the like.

In various examples, the perception engine 140 can dynamically compare the live sensor data 115 from the SDV's sensor systems 102 to the current localization map 133 as the SDV 100 travels through a corresponding road segment. The perception engine 140 can flag or otherwise identify any objects of interest in the live sensor data 115 that can indicate a potential hazard. In accordance with many examples, the perception engine 140 can output a processed sensor view 141 indicating such objects of interest to a prediction engine 150, which can predict a path of each object of interest and determine whether the SDV control system 120 should respond or react accordingly. For example, the prediction engine 150 can dynamically calculate a collision probability for each object of interest, and generate event alerts 151 if the collision probability exceeds a certain threshold. As described herein, such event alerts 151 can be processed by a vehicle control module 155 that generates control commands 158 executable by the various control mechanisms 170 of the SDV 100, such as the SDV's acceleration, steering, and braking systems 172, 174, 176.

On a higher level, the SDV control system 120 can include a dynamic routing engine 125 that provides the vehicle control module 155 with a travel trajectory 126 along a current route 139 to a destination 137. The current route 139 may be determined by a backend transport routing system 190, or may be determined by the SDV 100 via access to a local or external mapping service 195. In some aspects, the SDV 100 can include a user interface 145, such as a touch-screen panel or speech recognition features, which can enable a passenger to input a destination 137. Additionally or alternatively, the SDV control system 120 can include a communication interface 135 providing the SDV 100 with connectivity to one or more networks 185. In such implementations, the SDV 100 may communicate with a backend transport system 190 that manages routing of any number of SDVs operating throughout a given region to provide transportation services to requesting riders. Thus, the dynamical routing engine 125 may receive the destination 137 from the backend transport system 190 over the network(s) 185 in order to plan a current route 139 for the SDV 100.

In mapping the current route 139, the dynamic routing engine 125 can generally utilize an on-board mapping engine or an external mapping service 195 by transmitting map calls 131 over the network(s) 185 in order to receive a most optimal route 139 from a current location of the SDV 100 to the destination 137. This route 139 may be determined based on distance, time, traffic conditions, additional pick-ups (e.g., for carpooling services), and the like. For each successive road segment on which the SDV 100 travels, the dynamic routing engine 125 can provide trajectory data 126 to the vehicle control module 155, to enable the vehicle control module 155 to operate the SDV 100 safely to the next road segment or the destination 137. For example, the trajectory data 126 can indicate that the vehicle control module 155 must change lanes or make a turn in order to proceed to the next road segment along the current route 139.

According to examples provided herein, the vehicle control module 155 can utilize the trajectory data 126 and event alerts 151 to autonomously operate the control mechanisms 170 of the SDV 100. As a basic example, to make a simple turn based on the trajectory data 126, the vehicle control module 155 can generate control commands 158 that cause the lights and auxiliary systems 178 of the SDV 100 to activate the appropriate directional signal, the braking system 176 to slow the SDV 100 down for the turn, the steering system 174 to steer the SDV 100 into the turn, and the acceleration system 172 to propel the SDV 100 when exiting the turn. In further examples, event alerts 151 may indicate potential hazards such as a pedestrian crossing the road, obstacles on the road, a construction area, proximate vehicles, an upcoming traffic signal and signal state, and the like. The vehicle control module 155 can respond to each event alert 151 on a lower level while, on a higher level, operating the SDV 100 along the determined route 139.

In various examples, the backend transport routing system 190 can manage high level routing for a fleet of self-driving vehicles 199 operating throughout a given region. For example, the transport system 190 can receive pick-up requests from requesting users or riders seeking on-demand transportation services, such as the various on-demand transportation arrangement services provided by UBER TECHNOLOGIES Inc., of San Francisco, Calif. In such examples, when a requesting user submits a pick-up request to the transport system 190, the transport system 190 can identify a set of proximate vehicles (e.g., SDVs and/or human-driven vehicles) with respect to a pick-up location for the requesting user. In various aspects, the transport system 190 can receive location pings 121 from location-based resources (e.g., GPS units 122) of SDVs and/or driver devices (e.g., smartphones executing a designated driver application) to identify their locations. The transport system 190 may then select a most optimal driver or SDV 100 amongst the proximate set and transmit an invitation (for human drivers) or an instruction (for SDVs) to service the pick-up request. In certain examples, once a confirmation is received from the SDV 100 or human driver, the transport system 190 can transmit a route update 191 indicating the pick-up location, and in some aspects, an optimal route from the current location of the driver or SDV 100 to the pick-up location.

Examples described herein can leverage the sensor data 115 from the sensor systems 102 of the SDV 100 to provide the transport system 100 with a highly granular traffic view of the given region. In various implementations, the SDV 100 can transmit localized traffic context data 129—comprising image or LIDAR data from the SDV's sensor systems 102—to the backend transport routing system 190, which can indicate the immediate traffic situation of the SDV 100. Thus, not only can the location pings 121 from the GPS unit 122 contribute to the live traffic view, but also the sensor data 115 from the SDV's sensor systems 102. In certain aspects, the live, localized traffic context update 129 may be a streamed as video content from a specified camera of the camera system 101, or may be provided as image content. Accordingly, the live traffic context update 129 from the SDV 100 can be transmitted to the backend transport system 190 to provide context to a given traffic situation.

In some aspects, the transport system 190 can identify the origination of a traffic situation using the location pings 121, and can make a traffic request 193 to the SDV 100 for the traffic context update 129. In response to the traffic request 193, the dynamic routing engine 125 can generate a traffic context update 129 from the processed sensor view 141, and transmit the traffic context update 129 to the transport system 190. As provided herein, the transport system 190 can utilize the traffic context updates 129 from the SDV 100 and the other SDVs in the fleet 199 to ensure a more robust traffic view of the given region, as compared to simply utilizing the location pings 121 from the GPS units 122.

In accordance with several examples, the SDV 100 may then receive route updates 191 for the current route 139 from the backend transport routing system 190 based on localized traffic context updates 129 from other SDVs operating throughout the given region. In utilizing both the localized traffic context data 129 as well as the location pings 121, the transport system 190 can provide a more robust routing service for the SDV 100 as the SDV 100 operates from destination to destination.

In addition to providing the transport system 190 with more precise backend routing capabilities, the dynamic routing engine 125 can also provide the SDV 100 with increased frontend routing precision. According to examples described herein, the dynamic routing engine 125 can dynamically analyze the processed sensor view 141 as the vehicle control module 155 autonomously operates the control mechanisms 170 of the SDV 100 along the trajectory 126 provided, and in response to the event alerts 151 from the prediction engine 150. In certain instances, the combined functions of the vehicle control module 155, perception engine 140, and/or prediction engine 150 may result in an anomalous event for the SDV 100, such as a missed turn or exit, an inability to merge into a particular lane, a closed road or construction zone preventing route progression, and the like. In variations, given the dynamic nature of traffic, the SDV 100 may benefit significantly from actively anticipating and/or preempting such anomalous events.

In various implementations, the dynamic routing engine 125 can analyze the processed sensor view 141 to identify one or more upcoming decision points along the current route 139 and a current traffic situation. As provided herein, the decision points can correspond to upcoming turns, lane changes, highway exits or entrances, and the like. In certain situations, the dynamic routing engine 125 can determine that the trajectory 126 to an upcoming decision point is clear of traffic and/or includes minimal data analysis and decision making, and can therefore continue to provide the sequential trajectories 126 to the vehicle control module 155 to enable the progression along the current route 139. In other situations, the dynamic routing engine 125 can determine that the trajectory 126 to an upcoming decision point is impeded or that a current traffic situation will likely prevent the vehicle control module 155 from successfully progressing the SDV 100 along the current route 139. For example, an upcoming turn may require the SDV 100 to quickly change through multiple lanes of dense traffic.

According to examples, the dynamic routing engine 125 can identify an upcoming decision point and transmit a route inquiry 127 to the transport system 190. The route inquiry 127 can comprise a request for a set of one or more alternative route options 192 that the SDV 100 can take as opposed to the current route 139 through the decision point. In response to the route inquiry 127, the transport system 190 can determine a number of alternative routes to the destination 137 from the SDV's current location. In addition, the transport system 190 can determine a time delta for each of the alternative routes, where the time delta indicates an estimated additional or total amount of time that it will take the SDV 100 to reach the destination 137 if the alternative route is selected. Further still, the transport system 190 can perform a backend risk analysis for each of the alternative routes, and can provide the dynamic routing engine 125 with a risk score for selecting the alternative route. For example, an alternative route may involve increased lane changes and additional intersections that may subvert the perceived benefits of selecting the alternative route in the first place. The transport system 190 can identify such route characteristics and can provide a cost score (e.g., including an estimated time delta and risk factor) for each of the alternative routes.

Accordingly, the route options 192 provided by the transport system 190 can include a number of alternative routes and a cost indication or score for selecting a respective route from the route options 192. Additionally or alternatively, each of the alternative routes can be attributed to an estimated time increase or savings as determined by the transport system 190 based on the live traffic data provided to the transport system 190 (e.g., location pings 121 and traffic context data 129 provided by other SDVs in the fleet 199). In certain examples, the dynamic routing engine 125 can select a most optimal alternative route from the route options (e.g., a least costly route) and provide trajectory data 126 corresponding to the selected alternative route to the vehicle control module 155.

In variations, the dynamic routing engine 125 can perform a local cost analysis for each of the alternative routes in the route options 192 to ultimately select a route. In certain respects, the cost analysis performed by the transport system 190 may be similar to the cost analysis performed by the dynamic routing engine 125. For example, both cost analyses may account for such cost factors as time and risk (e.g., seeking to minimize both risk and time). However, it is contemplated that the cost analysis performed by the transport system 190 can be based on map data and an overall traffic view in light of the location pings 121 and/or traffic context data 129 provided by the SDV fleet 199. In addition, the transport system 190 can further determine an added monetary cost for each alternative route.

Conversely, the cost analysis performed by the dynamic routing engine 125 can be based on the processed sensor view 141, providing an immediate, real-time, localized view of the actual consequences of selecting a particular route alternative. Thus, the dynamic routing engine 125 can account for the feasibility of executing a particular route option (e.g., whether a lane change can be decisively made or a merge into a turn lane). Accordingly, as provided herein, the selected route may comprise a most optimal route from the route options 192 as determined through both a backend cost analysis by the transport system 190 and a local, frontend cost analysis by the dynamic routing engine 125, or can remain on the current route 139 if the current route 139 is still most optimal following the cost analyses for each of the route options 192. If an alternative route is selected from the route options 192, then the dynamic routing engine 125 can provide a trajectory update 128 to the vehicle control module 155 to cause the SDV 100 to progress along the selected alternative route.

It is contemplated that the dynamic routing engine 125 can determine the alternative route options 192 itself. For example, the dynamic routing engine 125 can identify a decision point in the processed sensor view 141, and then determine the route options 192 through an on-board mapping resource or via map calls 131 to an external mapping service 195. In one aspect, the dynamic routing engine 125 can identify the alternative route options 192 and perform a local cost analysis using the processed sensor view 141 to determine which of route options 192 is most optimal, and then provide a trajectory update 128 to the vehicle control module 155 to enable the SDV 100 to progress along the selected alternative route.

As an example, the dynamic routing engine 125 can identify a decision point along a current route 139 and make a local risk assessment (e.g., for a dangerous left turn). If the risk corresponding to the decision point exceeds a predetermined risk threshold, the dynamic routing engine 125 can, by default, select an alternative route upon which to diverge the SDV 100. In one aspect, the selected alternative route can be selected after the SDV 100 continues along a current road (e.g., avoiding the dangerous left turn). Additionally or alternatively, the alternative route may be selected based on an optimization between risk and time of a plurality of alternative routes 192 identified by the dynamic route engine 125 in analyzing the processed sensor view 141 and/or a mapping resource (e.g., a live traffic map). In such examples, the dynamic routing engine 125 can determine a risk factor and a time cost for each of the alternative route options 192, and select a most optimal one of the alternative routes 192 (e.g., seeking to minimize both risk and time). Accordingly, the dynamic routing engine 125 can optimize the risk factor and time cost for a plurality of identified route alternatives and select a most optimal route based on the risk and time optimization. The dynamic routing engine 125 may then transmit a trajectory update 128 to the vehicle control module 155 to update the route 139 to follow the most optimal route. Further description of the dynamic routing engine 125 in connection with the SDV control system 120 is provided in the below discussion of FIG. 2.

Figure 2:
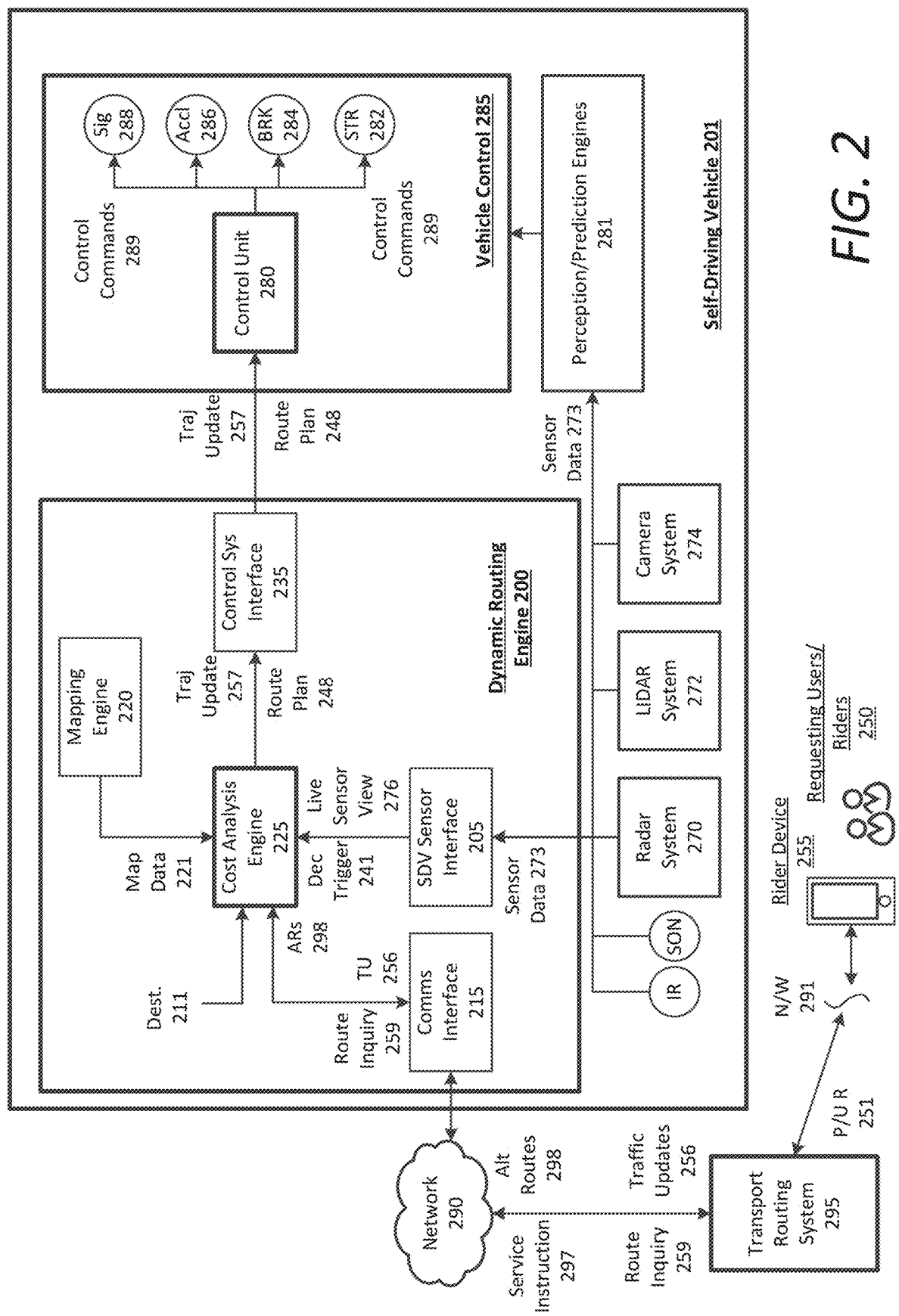
FIG. 2 is a block diagram illustrating an example dynamic routing engine utilized in connection with a self-driving vehicle, according to examples described herein.

FIG. 2 is a block diagram illustrating an example dynamic routing engine utilized in connection with a self-driving vehicle, according to examples described herein. In the below description of FIG. 2, certain logical blocks of the SDV 201 are omitted or combined for the sake of illustration and emphasis on the features and functions of the dynamic routing engine 200. Thus, one or more features as shown and described with respect to FIG. 1 may be included as a component of FIG. 2. Furthermore, the dynamic routing engine 200 as shown and described with respect to FIG. 2 can comprise the dynamic routing engine 125 of the SDV control system 120 as shown and described with respect to FIG. 1. Referring to FIG. 2, the dynamic routing engine 200 can include an SDV sensor interface to receive sensor data 273 from the various sensor systems of the SDV 201, such as the radar system 270, LIDAR system 272, the camera system 274, and other sensors (e.g., infrared and sonar). The sensor data 273 can be provided to a cost analysis engine 225 of the dynamic routing engine 200 as a live sensor view 276 of the SDV's situational environment.

The dynamic routing engine 200 can provide a route plan 248 to the vehicle control system 285 of the SDV 201. For each successive destination 211 provided, the dynamic routing engine 200 can provide an initial route plan 248, which can correspond to a most optimal route to the destination 211 (e.g., in terms of distance, time, and/or cost). In some aspects, the destination 211 can be provided to the dynamic routing engine 200 by the backend transport routing system 295, or from a passenger via a user interface of the SDV 201. In certain examples, cost analysis engine 225 can determine the most optimal route to the destination 211. In variations, the transport system 295 can provide an initial route to the destination 211. In either case, the dynamic routing engine 200 can provide the initial route plan 248 to the vehicle control system 285. As provided herein, the vehicle control system 285 can include a control unit 280 that can generate control commands 289 based on the route plan 248. The control commands 289 can be executed by the signaling 288, acceleration 286, braking 284, and steering systems 282 of the SDV 201 to operate the SDV 201 autonomously along the optimal route to the destination 211.

In some examples, the destination 211 can be included in a service instruction 297 from the transport routing system 295. For example, the dynamic routing system 200 can include a communications interface 215 that can communicate with the transport routing system 295 via one or more networks 290. As described herein, the service instruction 297 can originate from a pick-up request 251 transmitted over network 291 from a rider device 255 of a requesting user or rider 250. As discussed above with respect to FIG. 1, the transport routing system 295 can direct a fleet of SDVs operating throughout the given region to service the pick-up requests 251 from the requesting users 250. Accordingly, upon receiving a pick-up request 251, the transport system 295 can identify a candidate set of drivers or SDVs that are proximate to a pick-up location indicating in the request 251, and select an optimal driver or vehicle to service the request 251.

As shown in FIG. 2, the SDV 201 can be selected by the transport system 295 to service a particular pick-up request 251, and can receive a service instruction 297 to autonomously drive to a pick-up location (i.e., a first destination 211) to rendezvous with the requesting user 250, and then transport the user 250 to a given destination location (i.e., a second destination 211). For each successive destination 211, the dynamic routing engine 200 or the transport system 295 can determine an initial route, which the dynamic routing engine 200 can utilize to generate the route plan 248 for the vehicle control system 285. As provided herein, the route plan 248 can comprise trajectory information for each road segment of the route (e.g., a road segment corresponding to a current localization map). Thus, the route plan 248 can indicate that the vehicle control system 285 must change lanes, remain in a current lane, make a turn, etc., on a given road segment.

As further provided herein, the perception and prediction engines 281 can receive the sensor data 273 from the various sensor systems of the SDV 201, and provide the vehicle control system 285 with outputs such as alerts and indications corresponding to detected objects of interest, such as proximate vehicles, pedestrians, obstacles, traffic signals, road signs, and the like. The vehicle control system 285 can identify a trajectory indicated in the route plan 248, and process the alerts and indications from the perception and prediction engines 281 in operating the SDV's braking 284, steering 282, acceleration 286, and signaling systems 288 to execute the trajectory.

According to examples, as the SDV 201 operates along the current route plan 248, the cost analysis engine 225 can dynamically analyze the live sensor view 276 to identify any decision triggers 241 for the current route. As described, a decision trigger 241 can comprise a blocked path for the current route, for example, due to dense or aggressive traffic, a closed road, road construction, etc. In variations, the decision trigger 241 can simply correspond to a detected lane change along the trajectory, an intersection, a highway off-ramp or on-ramp, and the like. As another example, if a decision trigger 241 corresponding to an upcoming turn is indicated by the live sensor view 276 to be risky due to high traffic, the cost analysis engine 225 can select an alternative route option 298 that enables the SDV 201 to continue along a current road to avoid the upcoming turn. In certain implementations, decision triggers 241 can be pre-configured into localization maps or in map data 221. Generally, when a decision trigger 241 is identified, the cost analysis engine 225 can generate and transmit a route inquiry 259 to the transport routing system 295.

The route inquiry 259 can cause the transport routing system 295 to determine a set of alternative routes 298 that the SDV 201 can take from a decision point location along the SDV's current route. As described with respect to FIG. 1, the set of alternative routes, or route options 192, can each include one or more scores (e.g., a time score, a risk score, a monetary cost score, an overall cost score, etc.), or can be ranked in accordance with a lowest added cost or detriment to the SDV 201 (e.g., in terms of risk, added time, monetary cost, etc.). In variations, the set of alternative routes 298 can comprise at least one alternative route based on static map data, such as one or more routes based solely on distance. The set of alternative routes 298 can be received by the cost analysis engine 225 which can perform a cost optimization using the live sensor view 276 to determine a most optimal route.

The cost optimization performed by the cost analysis engine 225 can comprise a single cost metric (e.g., time), or multiple cost metrics (e.g., time and risk). Thus, in one aspect, the cost analysis engine 225 can optimize the set of alternative routes based solely on risk, and can select an alternative route that comprises the minimal risk. In this example, if a set of three alternative routes are provided in the set 298, then the cost analysis engine 225 can analyze the live sensor view 276 to identify the traffic situation and determine a risk of selecting each of the routes. For example, the live sensor view 276 can indicate whether an alternative route is blocked, whether the SDV 201 will need to change lanes, the traffic implications of selecting an alternative route, a number of vehicles in a turn lane for an alternative route, a traffic signal state for a respective alternative route, and the like. In this example, the cost analysis engine 225 can select a lowest risk route from the route alternatives 298, and generate a trajectory update 257 indicating the selected alternative route. The cost analysis engine 225 may then transmit the trajectory update 257 to the vehicle control system 285 to enable the SDV 201 to autonomously drive along the new route.

According to some examples, the cost analysis engine 225 can assess or optimize each of the route alternatives 298 against the current route plan 248. In such examples, if the current route plan 248 remains the lowest cost option (e.g., the lowest risk option and/or least time constrained option), then the cost analysis engine 225 can enable the vehicle control system 285 to continue along the current route.

As stated herein, the cost analysis engine 225 can perform a cost optimization having multiple cost metrics, such as time, risk, and monetary cost. Thus, upon receiving the set of alternative routes 298, the cost analysis engine 225 can analysis the live sensor view 276 of the SDV 201 to identify each of the alternative routes 298 (as well as the current route), and optimize across the multiple cost metrics to converge on a most optimal route option. For example, the cost analysis engine 225 can determine a risk factor and a time delta for each of the alternative routes 298, and can optimize across each of the risk factors and the time deltas to select a most optimal route upon which to diverge the SDV 201. In some aspects, the most optimal route can comprise a route whose risk factor is below the predetermined risk threshold, and has a lowest time delta (or is the least time consuming). In variations, the most optimal route weighs more on risk, and can comprise a least risky alternative given a threshold time delta. For example, the cost analysis engine 225 can establish a threshold time delta of five minutes, and thus eliminate any route alternative whose time delta exceeds five minutes. The resultant set of route alternatives may then be ranked accordingly to risk, and a least risky route alternative may be selected. The cost analysis engine 225 can then generate a trajectory update 257 to be executed by the vehicle control system 285 to follow the most optimal route.

It is contemplated that at any given instance, the live sensor view 276 can indicate multiple decision triggers 241 or decision points along the current route plan 248, and can further identify future decision points along one or more of the alternative routes 298. Thus, in such instances, the cost analysis engine 225 can also account for the additional cost factors of those future decision points. For example, the live sensor view 276 may show one of the alternative routes to be clear and readily accessible, but may also show a construction zone or blocked path down the alternative route. Accordingly, the cost analysis engine 225 may further account for the construction zone or blocked path when ultimately making a route selection.

Along these lines, the cost analysis engine 225 can also submit a traffic update 256 comprising sensor data 273, or snippets of the live sensor view 276, back to the transport routing system 295 as feedback to increase robustness of the transport system's traffic view of the given region. As described herein, these traffic updates 256 can contribute to the traffic system 295 providing more granular route updates, as opposed to just using GPS data from a community of users (e.g., driver devices). The dynamic routing engine 200 can receive automatic route updates for the current route plan 248 from the transport routing system 295 based on both GPS data from users or SDVs and the traffic updates 256 provided by the SDVs.

Self-Driving Vehicle in Operation

Figure 3:
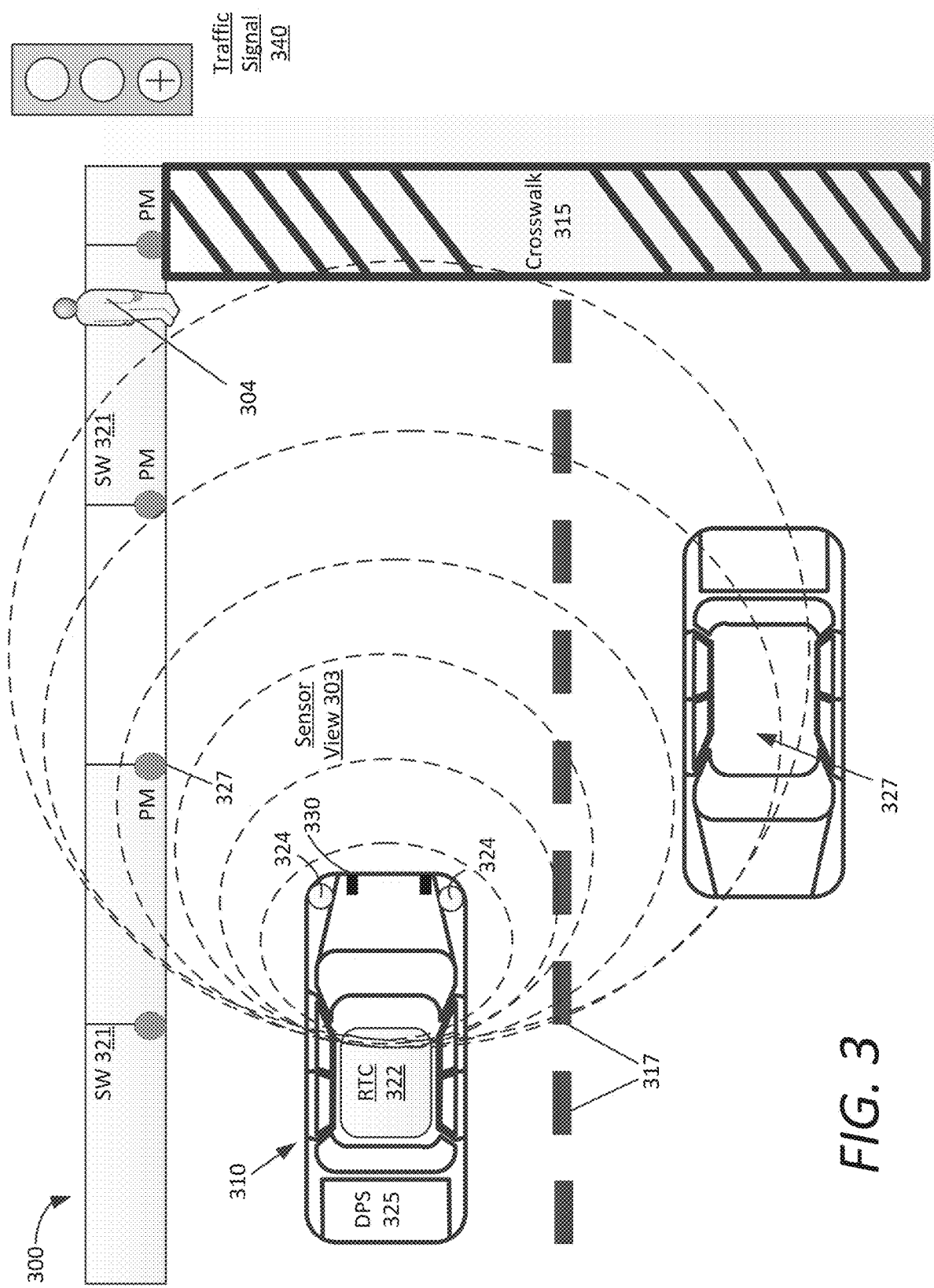
FIG. 3 shows an example of an autonomously controlled self-driving vehicle utilizing sensor data to navigate an environment in accordance with example implementations.

FIG. 3 shows an example of an autonomously controlled self-driving vehicle utilizing sensor data to navigate an environment in accordance with example implementations. In an example of FIG. 3, the autonomous vehicle 310 may include various sensors, such as a roof-top camera array (RTC) 322, forward-facing cameras 324 and laser rangefinders 330. In some aspects, a data processing system 325, comprising a combination of one or more processors, FPGAs, and/or memory units, can be positioned in the cargo space of the vehicle 310.

According to an example, the vehicle 310 uses one or more sensor views 303 (e.g., a stereoscopic or 3D image of the environment 300) to scan a road segment on which the vehicle 310 traverses. The vehicle 310 can process image data or sensor data, corresponding to the sensor views 303 from one or more sensors in order to detect objects that are, or may potentially be, in the path of the vehicle 310. In an example shown, the detected objects include a pedestrian 304 and another vehicle 327—each of which may potentially cross into a road segment along which the vehicle 310 traverses. The vehicle 310 can use information about the road segment and/or image data from the sensor views 303 to determine that the road segment includes a divider 317 and an opposite lane, as well as a sidewalk (SW) 321, and sidewalk structures such as parking meters (PM) 327.

The vehicle 310 may determine the location, size, and/or distance of objects in the environment 300 based on the sensor view 303. For example, the sensor views 303 may be 3D sensor images that combine sensor data from the roof-top camera array 322, front-facing cameras 324, and/or laser rangefinders 330. Accordingly, the vehicle may accurately detect the presence of objects in the environment 300, allowing the vehicle to safely navigate the route while avoiding collisions with other objects.

According to examples, the vehicle 310 may determine a probability that one or more objects in the environment 300 will interfere or collide with the vehicle 310 along the vehicle's current path or route. In some aspects, the vehicle 310 may selectively perform an avoidance action based on the probability of collision. The avoidance actions may include velocity adjustments, lane aversion, roadway aversion (e.g., change lanes or drive further from the curb), light or horn actions, and other actions. In some aspects, the avoidance action may run counter to certain driving conventions and/or rules.

The SDV 310 can further detect certain road features that can increase the vehicle's alertness, such as a crosswalk 315 and a traffic signal 340. In the example shown in FIG. 3, the SDV 310 can identify that the pedestrian 304 is proximate to the crosswalk 315 and enter a high alert state. Furthermore, the SDV 310 can identify the signal state of the traffic signal 340 (e.g., green) to determine acceleration and/or braking inputs as the SDV 310 approaches the intersection.

Figure 4:
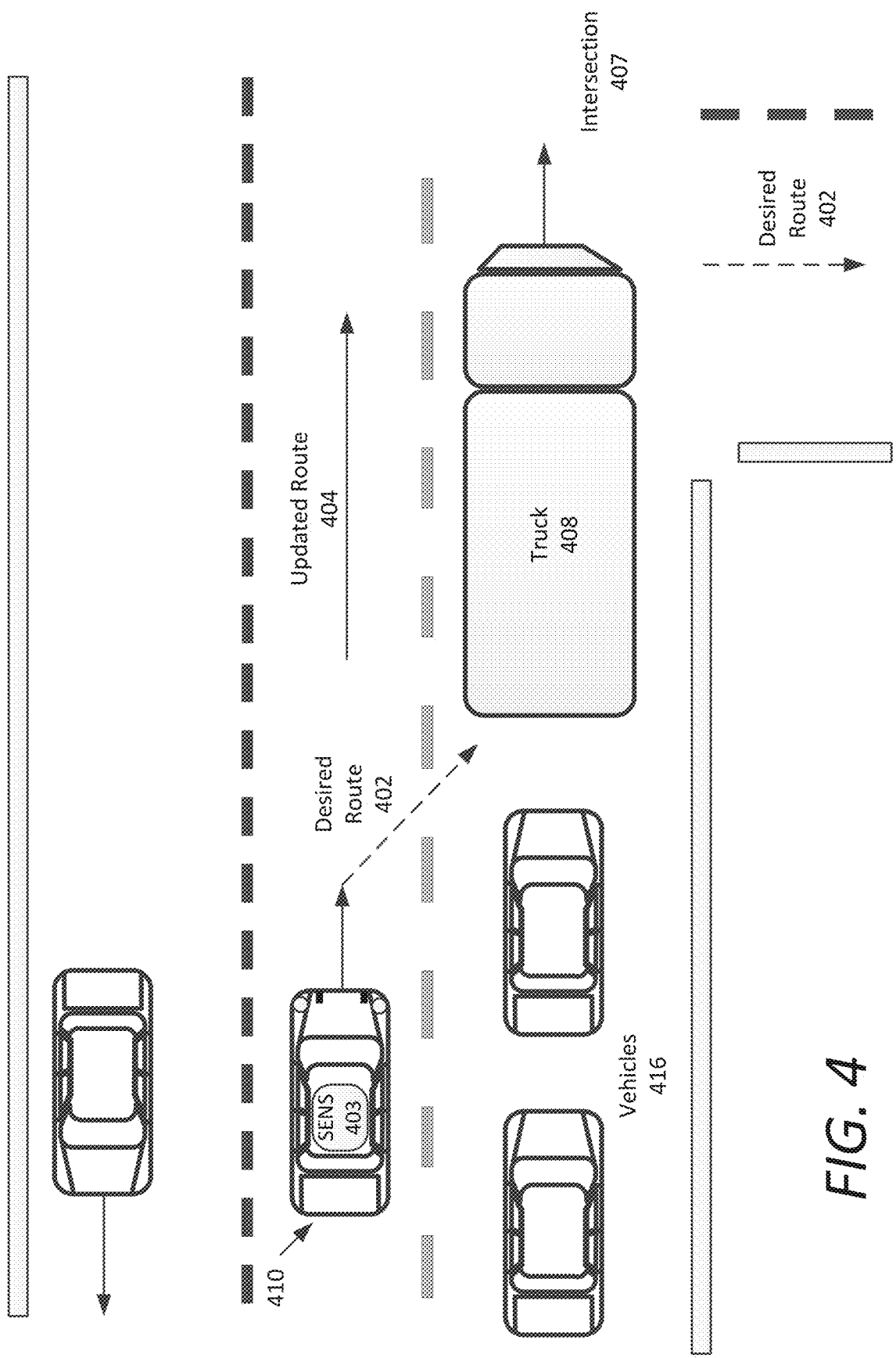
FIG. 4 shows an example self-driving vehicle executing an updated route, in accordance with example implementations.

FIG. 4 shows an example self-driving vehicle executing an updated route, in accordance with example implementations. The SDV 410 can operate through road traffic in a given environment, and can generally follow a current route plan that takes the SDV 410 towards a desired route 402. However, in the example shown, a truck 408 and other vehicles 416 are preventing the SDV 410 from changing lanes to continue progressing along the desired route 402 at an upcoming intersection 407. The SDV 410 can identify the scenario via sensor data from an on-board sensor system 403, which can trigger the SDV 410 to transmit a route inquiry to a backend transportation routing system. The transport routing system can provide a number of alternative route options for the SDV 410, which can cause the SDV 410 to perform a cost optimization for each of the alternative routes. In certain situations, the desired route 402 may still be most optimal, which can cause the SDV 410 to slow down, signal, and attempt to merge into the right lane to continue along the desired route 402. In variations, the returned route options can include a more optimal route than the desired route 402 (e.g., given the present risk of merging into traffic). Thus, the SDV 410 can update its trajectory and follow the updated route 404 to the destination.

Methodology

Figure 5:
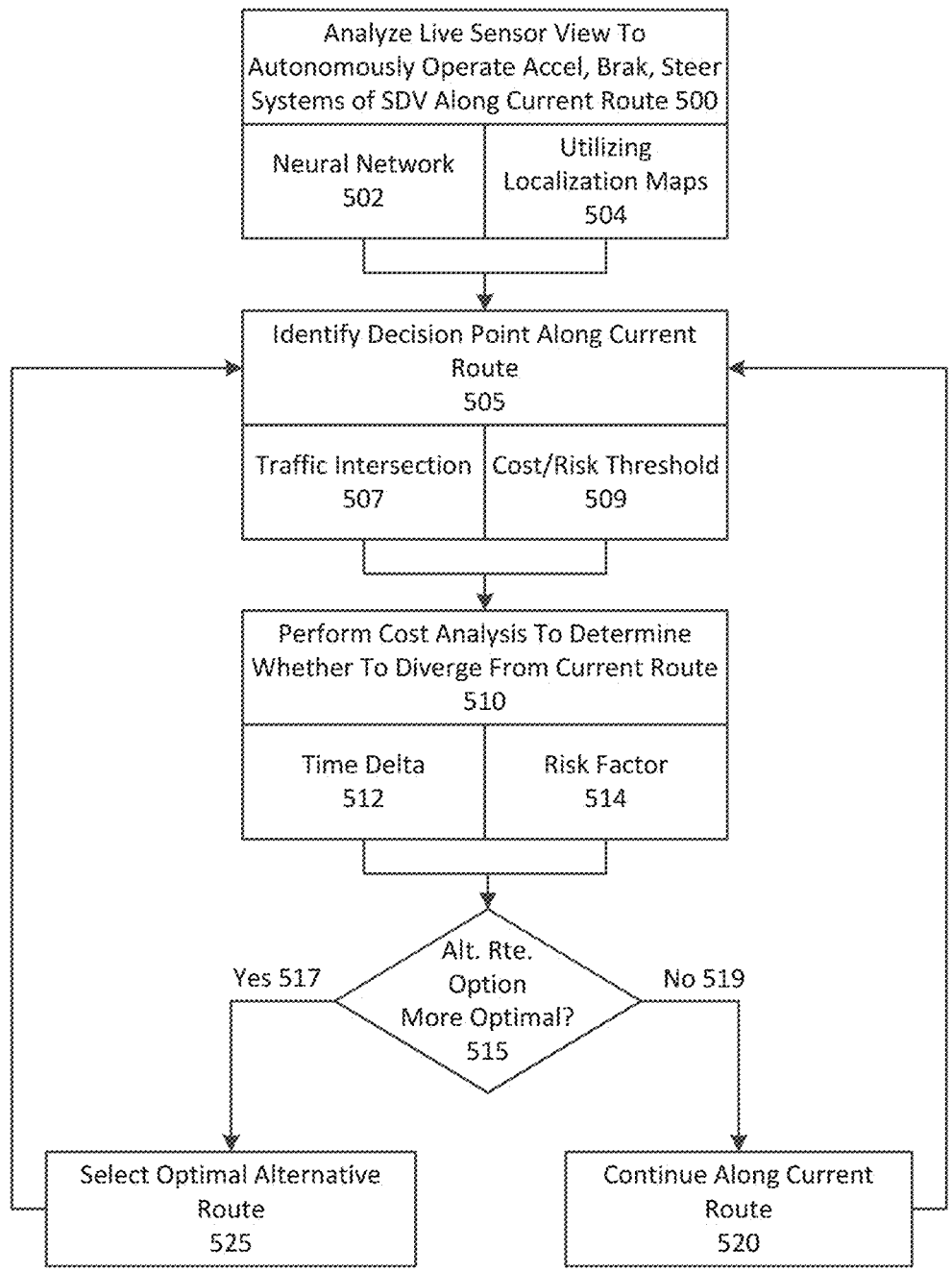
FIG. 5 is a flow chart describing an example method of operating a self-driving vehicle using dynamic routing, according to examples described herein.
Figure 6:
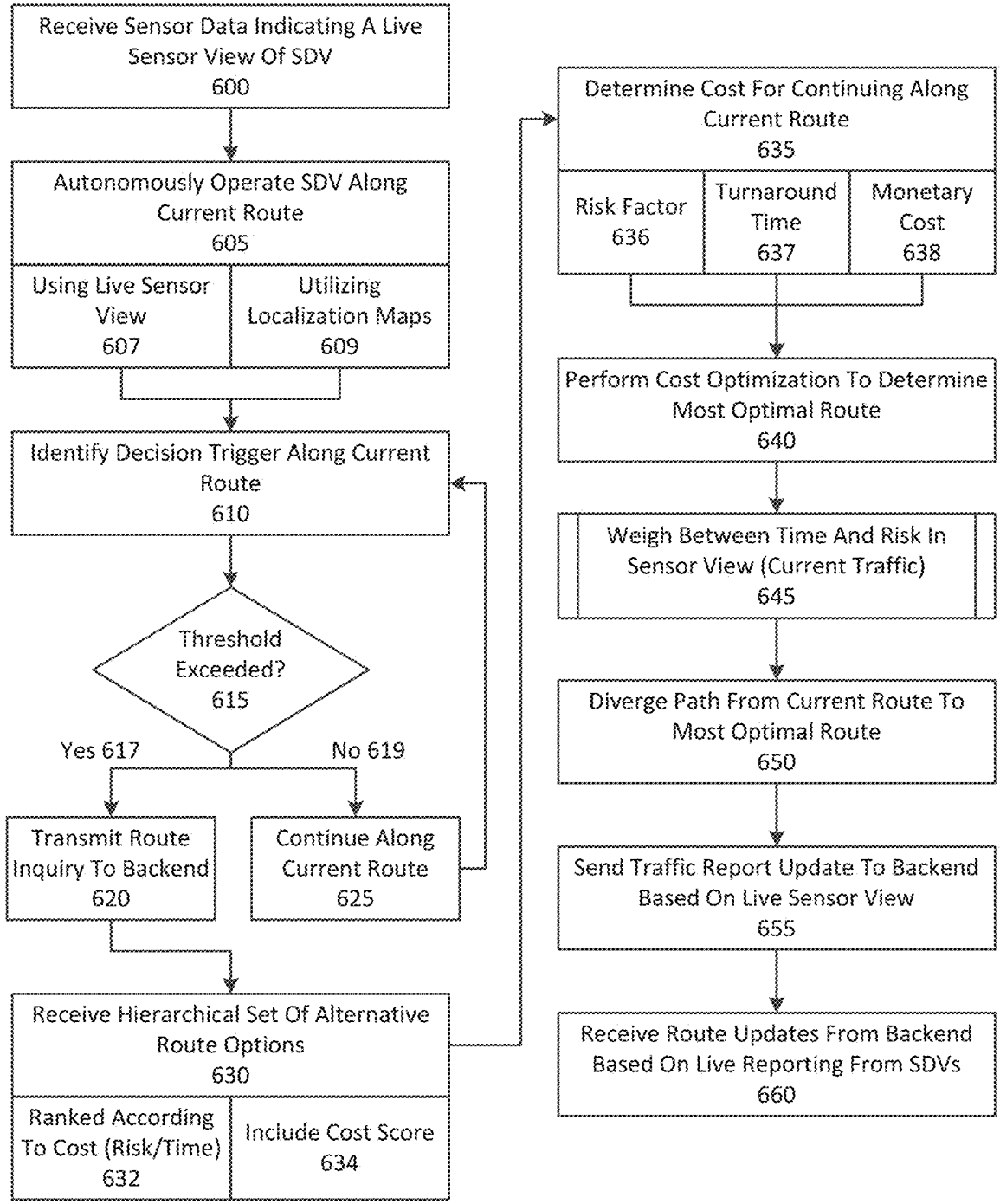
FIG. 6 is a lower level flow chart describing an example method of operating a self-driving vehicle using dynamic routing, according to examples described herein.

FIGS. 5 and 6 are flow charts describing example methods of autonomously operating a self-driving vehicle using dynamic routing, according to examples described herein. In the below descriptions of FIGS. 5 and 6, reference may be made to reference characters representing like features as shown and described with respect to FIGS. 1 and 2. Furthermore, the individual processes discussed with respect to FIGS. 5 and 6 may be performed by an example SDV control system 120 implementing a dynamic routing engine 125 as shown in FIG. 1, and/or an SDV 201 utilizing a dynamic routing engine 200 as shown in FIG. 2. Accordingly, in the below descriptions of FIGS. 5 and 6, reference may be made interchangeably to the SDV 100, 201 in general and/or the SDV control system 120 implementing a dynamic routing engine 125, 200 of FIGS. 1 and 2. Still further, it is contemplated that a particular step described either individually or as part of an additional step can be combined with or omitted from other individually described steps of FIGS. 5 and 6.

Referring to FIG. 5, the SDV control system 120 can analyze a live sensor view to autonomously operate acceleration, braking, and steering systems 172, 176, 174 of the SDV 100 (500). In certain implementations, the control system 120 can comprise a neural network executing a set of machine learning models to autonomously navigate throughout the given region (502). In variations, the control system 120 system can execute a set of instructions to dynamically compare the live sensor view 141 with a sequence of previously recorded localization maps 132 that comprise ground truth data of road segments upon which the SDV 100 travels (504). As the SDV 100 travels along a current route 139, the control system 120 can identify a decision point at which multiple route options are possible (505). In some examples, the decision point can simply comprise a traffic intersection along the current route (e.g., an upcoming left turn) (507). In variations, the decision point or immediate traffic situation can comprise a cost and/or predetermined risk threshold being crossed, as determined by a cost analysis engine 225 (509). For example, while operating along the current route 139, the control system 120 can determine that the current route 139 is blocked or that traffic is preventing the SDV 100 from continuing (e.g., identifying a dangerous left turn across speeding traffic).

In various implementations, upon identifying the decision point, the control system 120 can perform a cost analysis to determine whether to diverge from the current route 139 (510). For example, the control system 120 can identify one or more alternative routes, and can further calculate or otherwise estimate a time delta for each alternative route, as well as proceeding along the current route 139 (512). In further examples, the control system 120 can determine a risk factor for following each of the alternative routes, as well as the current route 139 (514). In performing the cost analysis, or cost optimization, the control system 120 can determine whether an alternative route is more optimal (e.g., less risky or the least risky option) than the current route 139 (515). If so (517), then the control system 120 can select the optimal alternative route by executing an updated trajectory to follow the alternative route (525). If not (519), then the control system 120 can continue along the current route 139 (520). Thereafter, the process may repeat from block (505) sequentially until the SDV 100 arrives at the destination.

FIG. 6 is a lower level flow chart describing an example method of operating a self-driving vehicle using dynamic routing, according to examples described herein. Referring to FIG. 6, the control system 120 can receive sensor data 115 indicating a live sensor view 141 of the surroundings of the SDV 100 (600). The control system 120 can further autonomously operate the SDV 100 along a current route 139 (605). In doing so, the control system can use the live sensor view (607) and a set of stored localization maps (609), and can dynamically compare the two in order to identify any possible road hazards or obstacles while driving along the current route 139. At any given time, the control system 120 can identify a decision trigger 241 along the current route 139 (610). As provided herein the decision trigger 241 can comprise a blocked path for the current route 139, for example, due to dense or aggressive traffic, a closed road, road construction, etc. In variations, the decision trigger 241 can simply correspond to a future lane change along the trajectory, an intersection, a highway off-ramp or on-ramp, and the like.

In some examples, a cost threshold for the current route 139 may trigger the control system 120 to transmit a route inquiry 127 to a backend transport system 190. As described herein, the cost threshold can comprise a single metric, such as risk or time, or can comprise a combination of cost metrics. Accordingly, the control system 120 can determine whether a cost threshold for continuing along the current route 139 is exceeded (615). If not (619), then the control system 120 can continue along the current route 139 and analyze the live sensor view 141 for decision triggers 241 (610). However, if the cost threshold is exceeded (e.g., a predetermined risk threshold) (617), the control system 120 can transmit a route inquiry 127 to the backend transport system 190 (620).

Based on the route inquiry 127, the control system 120 can receive a hierarchical set of alternative route options 192 from the backend transport system 190 (630). In certain examples, the route options 192 may be ranked according to cost (e.g., risk and/or time delta) (632). Additionally or alternatively, the route options 192 may further include one or more cost scores indicating the relative weight of the cost metric (634). For example, the risk metric may be scaled from one to one hundred, or the time metric may include an estimated added time for selecting a particular route option. In some implementations, the control system 120 can determine an overall cost for continuing along the current route 139 (635). Factors in this overall cost determination can include a risk factor (636), a turnaround time (637), or a monetary cost for making a detour to get back on the current route 139 (638).

The control system 120 may then perform a cost optimization to determine a most optimal route from each of the route options 192 and the current route 139 (640). In various examples, the cost optimization can comprise an analysis of the live sensor view 141 to weigh at least one of time or risk in selecting each of the alternative route options 192 to yield the most optimal result (645). For example, analysis of the live sensor view 141 can enable the control system 120 to identify that a decision point along the current route (e.g., a left turn) exceeds a predetermined risk threshold. Based on this determination, the control system 120 can, by default, diverge from the current route (e.g., continue straight along a current road), or can perform a cost analysis of a plurality of alternative routes to identify a least costly alternative route (e.g., in terms of risk alone, or risk and time). Accordingly, the control system 120 can diverge from the path of the current route 139 in order to select the most optimal alternative route (650).

In some aspects, the control system 120 can further send a traffic report back the transport system 190 based on the live sensor view 141 (655). As described, this traffic report can provide contextual data of a traffic situation as opposed to only GPS data. As such, the control system 120 can also receive route updates 191 for a current route 139 from the transport system 190 based on both location pings 121 from other SDVs in the fleet and/or computing devices of users, and the traffic context data 129 from the SDVs in the fleet 199 (660). The route updates 191 can cause the control system 120 to follow a new route without submitting a route inquiry 127 to the transport system 190.

Hardware Diagrams

Figure 7:
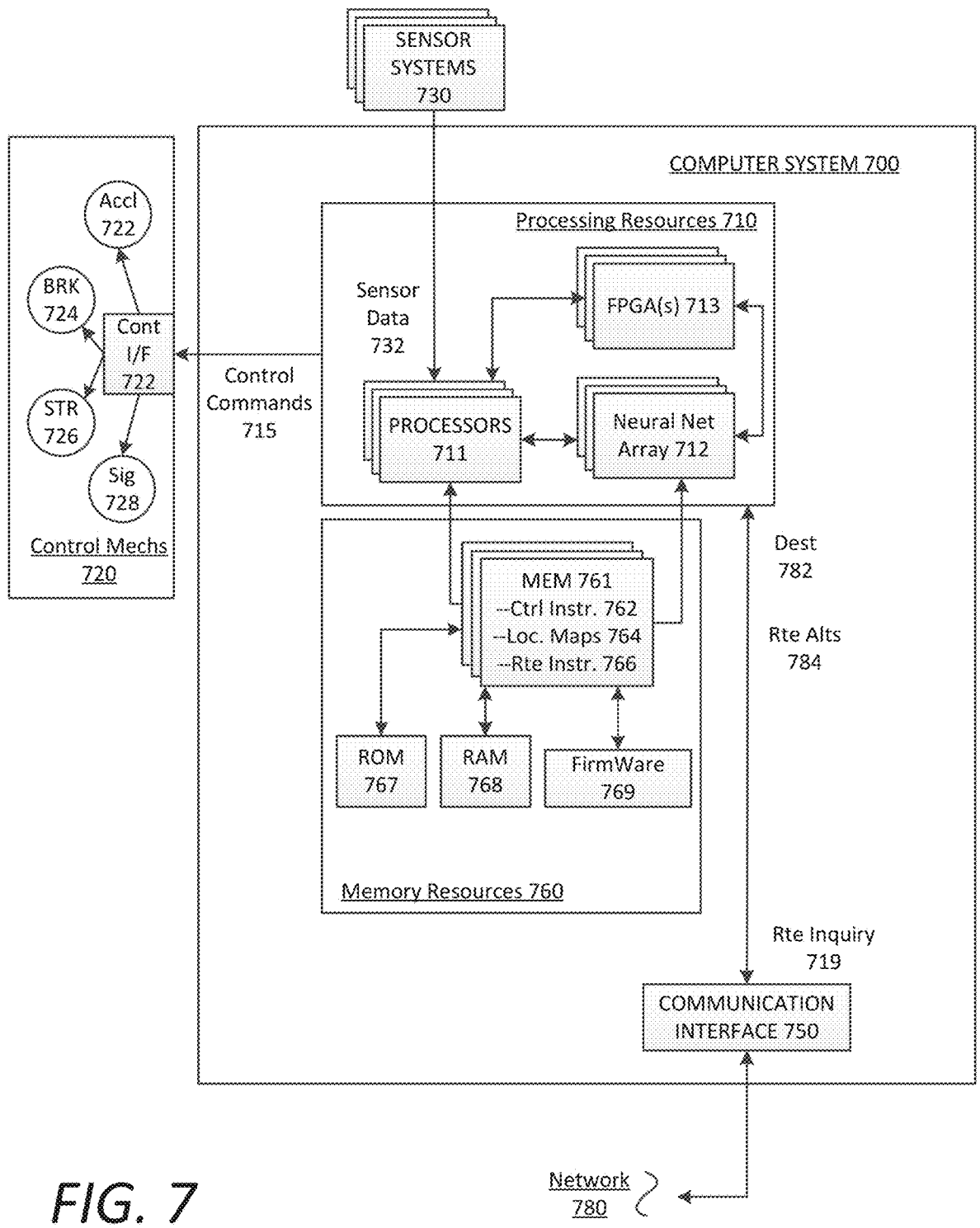
FIG. 7 is a block diagram illustrating a computer system for a self-driving vehicle upon which examples described herein may be implemented.

FIG. 7 is a block diagram illustrating a computer system upon which example SDV processing systems described herein may be implemented. The computer system 700 can be implemented using a number of processing resources 710, which can comprise processors 711, field programmable gate arrays (FPGAs) 713. In some aspects, any number of processors 711 and/or FPGAs 713 of the computer system 700 can be utilized as components of a neural network array implementing a machine learning model and utilizing road network maps stored in memory 761 of the computer system 700. In the context of FIGS. 1 and 2, various aspects and components of the control system 120, dynamic routing engine 125, 200, and perception and prediction engines 140, 150, 281, can be implemented using one or more components of the computer system 700 shown in FIG. 7.

According to some examples, the computer system 700 may be implemented within an autonomous vehicle or self-driving vehicle (SDV) with software and hardware resources such as described with examples of FIGS. 1 and 2. In an example shown, the computer system 700 can be distributed spatially into various regions of the SDV, with various aspects integrated with other components of the SDV itself. For example, the processing resources 710 and/or memory resources 760 can be provided in a cargo space of the SDV. The various processing resources 710 of the computer system 700 can also execute control instructions 762 using microprocessors 711, FPGAs 713, a neural network array 712, or any combination of the same.

In an example of FIG. 7, the computer system 700 can include a communication interface 750 that can enable communications over a network 780. In one implementation, the communication interface 750 can also provide a data bus or other local links to electro-mechanical interfaces of the vehicle, such as wireless or wired links to and from control mechanisms 720 (e.g., via a control interface 722), sensor systems 730, and can further provide a network link to a backend transport management system (implemented on one or more datacenters) over one or more networks 780. For example, the processing resources 710 can receive a destination 782 over the one or more networks 780, or via a local user interface of the SDV.

The memory resources 760 can include, for example, main memory 761, a read-only memory (ROM) 767, storage device, and cache resources. The main memory 761 of memory resources 760 can include random access memory (RAM) 768 or other dynamic storage device, for storing information and instructions which are executable by the processing resources 710 of the computer system 700. The processing resources 710 can execute instructions for processing information stored with the main memory 761 of the memory resources 760. The main memory 761 can also store temporary variables or other intermediate information which can be used during execution of instructions by the processing resources 710. The memory resources 760 can also include ROM 767 or other static storage device for storing static information and instructions for the processing resources 710. The memory resources 760 can also include other forms of memory devices and components, such as a magnetic disk or optical disk, for purpose of storing information and instructions for use by the processing resources 710. The computer system 700 can further be implemented using any combination of volatile and/or non-volatile memory, such as flash memory, PROM, EPROM, EEPROM (e.g., storing firmware 769), DRAM, cache resources, hard disk drives, and/or solid state drives.

The memory 761 may also store localization maps 764 in which the processing resources 710—executing the control instructions 762—continuously compare to sensor data 732 from the various sensor systems 730 of the SDV. Execution of the control instructions 762 can cause the processing resources 710 to generate control commands 715 in order to autonomously operate the SDV's acceleration 722, braking 724, steering 726, and signaling systems 728 (collectively, the control mechanisms 720). Thus, in executing the control instructions 762, the processing resources 710 can receive sensor data 732 from the sensor systems 730, dynamically compare the sensor data 732 to a current localization map 764, and generate control commands 715 for operative control over the acceleration, steering, and braking of the SDV. The processing resources 710 may then transmit the control commands 715 to one or more control interfaces 722 of the control mechanisms 720 to autonomously operate the SDV through road traffic on roads and highways, as described throughout the present disclosure.

The memory 761 may also store routing instructions 766 that the processing resources 710 can execute to identify decision points along a route, transmit route inquiries 719 to the backend transport system over the network 780, and receive a set of route alternatives 784 in return. Execution of the routing instructions 766 can cause the processing resources 710 to perform cost analyses for each of the route options in order to determine a most optimal route. Thereafter, the processing resources 710 can generate control commands 715 to can the control mechanisms 720 to autonomously drive the SDV along the most optimal route.

Figure 8:
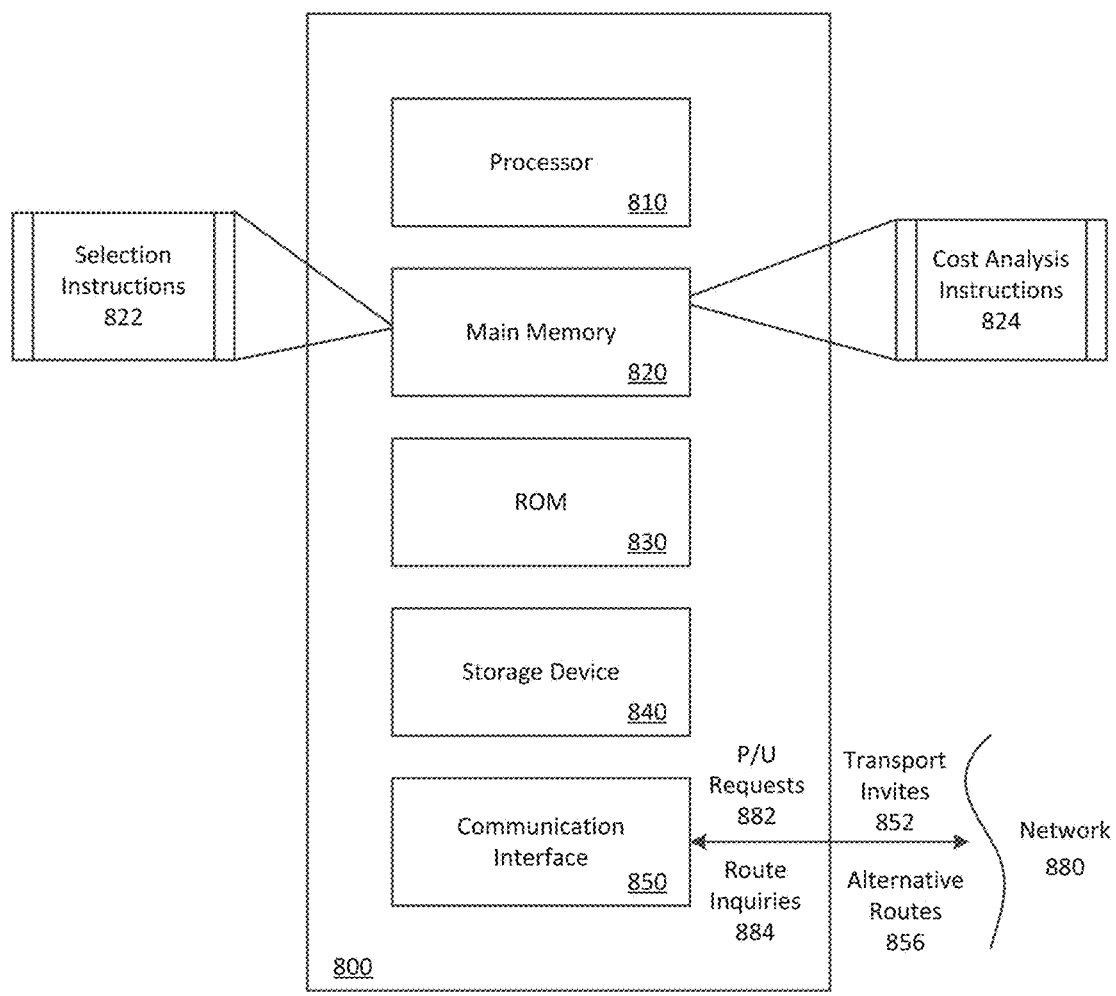
FIG. 8 is a block diagram illustrating a computer system for a backend datacenter upon which example transport systems described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing transportation services. In the context of FIGS. 1 and 2, the transport system 190, 295 may be implemented using a computer system 800 such as described by FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate with one or more networks 880 (e.g., cellular network) through use of the network link (wireless or wired). Using the network link, the computer system 800 can communicate with one or more computing devices, one or more servers, and/or one or more self-driving vehicles. In accordance with examples, the computer system 800 receives pick-up requests 882 from mobile computing devices of individual users. The executable instructions stored in the memory 830 can include selection instructions 822, which the processor 810 executes to select an optimal driver or SDV to service the pick-up request 882. In doing so, the computer system can receive vehicle locations of drivers and SDVs operating throughout the given region, and the processor can execute the selection instructions 822 to select an optimal driver or SDV from a set of available vehicles, and transmit a transport invitation 852 to enable the driver to accept or decline the ride service offer, or to instruct the matched SDV to rendezvous with the requesting user.

The executable instructions stored in the memory 820 can also include cost analysis instructions 824, which enable the computer system 800 to receive route inquiries 884 from SDVs operating throughout the given region, determine a set of alternative routes 856, and transmit the set of alternative routes 856 to the SDVs, as described herein. As further described herein, execution of the cost analysis instructions 824 can cause the computer system 800 to determine one or more costs (e.g., risk and/or time) for each of the alternative routes 856.

By way of example, the instructions and data stored in the memory 820 can be executed by the processor 810 to implement an example transport system 190, 295 of FIGS. 1 and 2. In performing the operations, the processor 810 can receive pick-up requests 882 and submit transport invitations 852 to facilitate the servicing of the requests 882. Furthermore, the processor 810 can receive route inquiries 884 and traffic updates from SDVs operating throughout the given region, and provide route updates and alternative routes 856 in return.

The processor 810 is configured with software and/or other logic to perform one or more processes, steps and other functions described with implementations, such as described with respect to FIGS. 1-6, and elsewhere in the present application. Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A system comprising:
   one or more processors; and
   a memory storing an instruction set that, when executed by the one or more processors causes the system to:
     analyze a sensor view of a surrounding area of an autonomous vehicle by comparing the sensor view with a localization map comprising data defining the surrounding area, wherein the localization map identifies multiple objects of interest along a road segment that the autonomous vehicle traverses;
     based on comparing the sensor view with the localization map, identify a decision point along a current route of the autonomous vehicle, the decision point indicating a location at which a plurality of route options exist due to a possible hazard or obstacle at the location;
     determine that the decision point along the current route of the autonomous vehicle satisfies a predetermined risk threshold; and
     diverge the autonomous vehicle from the current route based at least in part on the decision point satisfying the predetermined risk threshold.

2. The system of claim 1, wherein the executed instruction set further causes the system to:
   in response to determining that the decision point satisfies the predetermined risk threshold, determine a plurality of alternative routes for the autonomous vehicle.

3. The system of claim 2, wherein the executed instruction set further causes the system to:
   determine a risk factor for each of the plurality of alternative routes;
   wherein the executed instruction set causes the system to diverge the autonomous vehicle from the current route by selecting an alternative route for the autonomous vehicle from the plurality of alternative routes based at least in part on the determined risk factor of each of the plurality of alternative routes.

4. The system of claim 2, wherein the executed instruction set further causes the system to:
   determine a time delta for each of the plurality of alternative routes;
   wherein the executed instruction set causes the system to diverge the autonomous vehicle from the current route by selecting an alternative route for the autonomous vehicle from the plurality of alternative routes based at least in part on the determined time delta of each of the plurality of alternative routes.

5. The system of claim 2, wherein the executed instruction set causes the system to determine the plurality of alternative routes by (i) transmitting a route option inquiry to a backend computing system, and (ii) based on the route option inquiry, receiving, from the backend computing system, the plurality of alternative routes.

6. The system of claim 5, wherein the backend computing system manages routing for a fleet of autonomous vehicles, including the autonomous vehicle, throughout a given region.

7. The system of claim 6, wherein the executed instruction set further causes the system to:
receive route updates for the autonomous vehicle from the backend computing system based on traffic context data submitted by individual vehicles in the fleet of autonomous vehicles.

8. The system of claim 5, wherein the executed instruction set further causes the system to:
transmit a localized traffic context update to the backend computing system, the localized traffic context update indicating a current traffic situation of the autonomous vehicle.

9. A non-transitory computer-readable medium storing an instruction set that, when executed by one or more processors, causes the one or more processors to:
analyze a sensor view of a surrounding area of an autonomous vehicle by comparing the sensor view with a localization map comprising data defining the surrounding area, wherein the localization map identifies multiple objects of interest along a road segment that the autonomous vehicle traverses;
based on comparing the sensor view with the localization map, identify a decision point along a current route of the autonomous vehicle, the decision point indicating a location at which a plurality of route options exist due to a possible hazard or obstacle at the location;
determine that the decision point along the current route of the autonomous vehicle satisfies a predetermined risk threshold; and
diverge the autonomous vehicle from the current route based at least in part on the decision point satisfying the predetermined risk threshold.

10. The non-transitory computer-readable medium of claim 9, wherein the executed instruction set further causes the one or more processors to:
in response to determining that the decision point satisfies the predetermined risk threshold, determine a plurality of alternative routes for the autonomous vehicle.

11. The non-transitory computer-readable medium of claim 10, wherein the executed instruction set further causes the one or more processors to:
determine a risk factor for each of the plurality of alternative routes;
wherein the executed instruction set causes the one or more processors to diverge the autonomous vehicle from the current route by selecting an alternative route for the autonomous vehicle from the plurality of alternative routes based at least in part on the determined risk factor of each of the plurality of alternative routes.

12. The non-transitory computer-readable medium of claim 10, wherein the executed instruction set further causes the one or more processors to:
determine a time delta for each of the plurality of alternative routes;
wherein the executed instruction set causes the one or more processors to diverge the autonomous vehicle from the current route by selecting an alternative route for the autonomous vehicle from the plurality of alternative routes based at least in part on the determined time delta of each of the plurality of alternative routes.

13. The non-transitory computer-readable medium of claim 10, wherein the executed instruction set causes the one or more processors to determine the plurality of alternative routes by (i) transmitting a route option inquiry to a backend computing system, and (ii) based on the route option inquiry, receiving, from the backend computing system, the plurality of alternative routes.

14. The non-transitory computer-readable medium of claim 13, wherein the backend computing system manages routing for a fleet of autonomous vehicles, including the autonomous vehicle, throughout a given region.

15. The non-transitory computer-readable medium of claim 14, wherein the executed instruction set further causes the one or more processors to:
receive route updates for the autonomous vehicle from the backend computing system based on traffic context data submitted by individual vehicles in the fleet of autonomous vehicles.

16. The non-transitory computer-readable medium of claim 13, wherein the executed instruction set further causes the one or more processors to:
transmit a localized traffic context update to the backend computing system, the localized traffic context update indicating a current traffic situation of the autonomous vehicle.

17. A computer-implemented method of operating an autonomous vehicle, the method being performed by one or more processors and comprising:
analyzing a sensor view of a surrounding area of the autonomous vehicle by comparing the sensor view with a localization map comprising data defining the surrounding area, wherein the localization map identifies multiple objects of interest along a road segment that the autonomous vehicle traverses;
based on comparing the sensor view with the localization map, identifying a decision point along a current route of the autonomous vehicle, the decision point indicating a location at which a plurality of route options exist due to a possible hazard or obstacle at the location;
determining that the decision point along the current route of the autonomous vehicle satisfies a predetermined risk threshold; and
diverging the autonomous vehicle from the current route based at least in part on the decision point satisfying the predetermined risk threshold.

18. The method of claim 17, further comprising:
in response to determining that the decision point exceeds the predetermined risk threshold, determining a plurality of alternative routes for the autonomous vehicle.

19. The method of claim 18, further comprising:
determining a risk factor for each of the plurality of alternative routes;
wherein diverging the autonomous vehicle from the current route comprises selecting an alternative route for the autonomous vehicle from the plurality of alternative routes based at least in part on the determined risk factor of each of the plurality of alternative routes.

20. The method of claim 18, further comprising:
determining a time delta for each of the plurality of alternative routes;

wherein diverging the autonomous vehicle from the current route comprises selecting an alternative route for the autonomous vehicle from the plurality of alternative routes based at least in part on the determined time delta of each of the plurality of alternative routes.

\* \* \* \* \*